(12) United States Patent
Jin et al.

(10) Patent No.: US 10,657,696 B2
(45) Date of Patent: May 19, 2020

(54) VIRTUAL REALITY SYSTEM USING MULTIPLE FORCE ARRAYS FOR A SOLVER

(71) Applicant: DeepMotion, Inc., Redwood City, CA (US)

(72) Inventors: Weihua Jin, Redwood City, CA (US); Kaichuan He, Redwood City, CA (US)

(73) Assignee: DeepMotion, Inc., Redwood City, CA (US)

( * ) Notice: Subject to any disclaimer, the term of this patent is extended or adjusted under 35 U.S.C. 154(b) by 0 days.

(21) Appl. No.: 15/841,239

(22) Filed: Dec. 13, 2017

(65) Prior Publication Data

US 2018/0165864 A1  Jun. 14, 2018

Related U.S. Application Data

(60) Provisional application No. 62/433,764, filed on Dec. 13, 2016.

(51) Int. Cl.
| | |
|---|---|
| *G06T 13/40* | (2011.01) |
| *G06F 3/01* | (2006.01) |
| *G06F 3/0346* | (2013.01) |
| *G06T 17/00* | (2006.01) |
| *G06F 3/147* | (2006.01) |
| *G09G 5/00* | (2006.01) |

(52) U.S. Cl.
CPC ............ *G06T 13/40* (2013.01); *G06F 3/011* (2013.01); *G06F 3/012* (2013.01); *G06F 3/017* (2013.01); *G06F 3/0346* (2013.01); *G06F 3/147* (2013.01); *G06T 17/005* (2013.01); *G09G 5/00* (2013.01)

(58) Field of Classification Search
CPC ....... G06T 13/40; G06F 3/0346; G06F 3/017; G06F 3/011; A61B 5/00
See application file for complete search history.

(56) References Cited

U.S. PATENT DOCUMENTS 6,088,035 A * 7/2000 Sudarsky ................ G06T 15/10
345/419
9,381,426 B1 7/2016 Hughes et al.
(Continued)

OTHER PUBLICATIONS

International Search Report and Written Opinion dated Mar. 7, 2018, International Patent Application No. PCT/US2017/066226, filed Dec. 13, 2017, 13 pages.

*Primary Examiner* — Samantha (Yuehan) Wang
(74) *Attorney, Agent, or Firm* — Philip H. Albert; Davis Wright Tremaine LLP (57) ABSTRACT

An interactive avatar display system provides a computer-generated view of a virtual space including an avatar that moves in the virtual space in response to movements of the user that are sensed by sensors. The number of sensed movements is less than the number of degrees of freedom of avatar movement. The interactive avatar display system computes an array of accelerations to apply to movable body parts of the avatar and computes the array of accelerations by solving equations of motions from masses of the movable body parts and an array of forces computed from an array of inverse dynamics force values for the movable body parts and one or both of an array of balance control force values or an array of locomotion control force values, taking into account a set of constraints for the avatar, and possible also environmental objects in the virtual space.

18 Claims, 5 Drawing Sheets

(56) References Cited

U.S. PATENT DOCUMENTS

| | | | |
|---|---|---|---|
| 2003/0018283 A1* | 1/2003 | Dariush | A61B 5/1038 600/595 |
| 2006/0061574 A1* | 3/2006 | Ng-Thow-Hing | G06T 13/40 345/473 |
| 2006/0286522 A1 | 12/2006 | Ng-Thow-Hing | |
| 2007/0083290 A1* | 4/2007 | Nagasaka | B25J 9/1671 700/245 |
| 2010/0261526 A1 | 10/2010 | Anderson et al. | |
| 2010/0302253 A1 | 12/2010 | Kipman et al. | |
| 2011/0009241 A1* | 1/2011 | Lane | A63B 24/0087 482/8 |
| 2012/0293518 A1* | 11/2012 | Geisner | G06F 3/011 345/474 |
| 2013/0127873 A1 | 5/2013 | Popovic et al. | |
| 2015/0379335 A1 | 12/2015 | Marlow et al. | |
| 2016/0093105 A1 | 3/2016 | Rimon et al. | |

* cited by examiner

Final Torque = ID Torque + Balance Torque + Locomotion Torque

VIRTUAL REALITY SYSTEM USING MULTIPLE FORCE ARRAYS FOR A SOLVER

CROSS-REFERENCE TO RELATED APPLICATION

This application claims priority to U.S. Provisional Patent Application No. 62/433,764, filed Dec. 13, 2016, entitled "VIRTUAL REALITY SYSTEM," which is hereby incorporated herein by reference.

FIELD OF THE INVENTION

The present disclosure generally relates to virtual reality. The disclosure relates more particularly to apparatus and techniques for generating and presenting a virtual reality environment for a user based on inputs from the user.

BACKGROUND

In a virtual reality environment, a user is presented with sensory input that is computer generated, often in response to user actions, such as actions that are sensed from VR/AR (virtual reality/augmented reality) input devices such as head-mounted displays ("HMDs") or hand-held VR controllers. The outputs of a virtual reality computer system might include visual output, audio output, touch output (haptic, pressure, temperature, etc.) and other outputs. The outputs are presented to the user in ways that immerse the user. For example, the user might be wearing a headgear that covers the user's eyes to immerse the user in an experience. The headgear might provide a processor with sensor inputs about head movement. If the processor creating the visual output can modify that visual output based on the sensor inputs so that the user perceives the scenery to be stable relative to the user's head movements, it can make the experience immersive. The visual output could be in the form of two video feeds, one per eye, presented to the user to form an apparent three-dimensional (3D) view.

The processor generates the visual output using computer-generated imagery (CGI) techniques. One approach to generating CGI output is for a processor to access a memory containing geometric models of objects and a scene description. A scene description might indicate positions in a virtual space for various objects. The objects can be solid objects, light sources, background, texture, etc. as is commonly known in the art of CGI. A renderer, which might be implemented as program code executed by the processor or a separate graphics chip, takes these objects, their locations, and parameters of a virtual "camera" (e.g., a specified viewpoint that is a position in the virtual space where the virtual camera is "located,", a specified view direction that is the camera angle of the virtual camera, and possibly also bounds of the camera's viewing window). From data representing those elements, the renderer determines (perhaps once every 90th of a second) where everything in the scene is relative to the camera parameters and generates an image (one for each eye in the case of 3D viewing).

For an immersive experience, it is often desired that the coordinate system of the virtual space be fixed relative to a coordinate system of the real-world space being occupied by the user. If the user rotates the user's head, the processor would want to shift the camera angle aligned with the user's head movements, so that the user perceives that the scenery is not moving relative to the user. Where there is the ability for the user to move about in the real-world space (or move on an apparatus that provides for user movement even if the user is actually fixed in one place), the processor would want to shift the position of the viewpoint of the virtual camera accordingly so that the displayed scenery moves consistent with the user's perception of the user's own movement in the real-world space.

For the processor to know how to make those adjustments to the camera viewpoint and view angle, the processor is supplied with information about movements. This might be in the form of sensor data from accelerometers and/or gyroscopes mounted on the headgear and other sensors to detect movement. Thus, a VR rig might comprise a headgear with rotation sensors, other motion/orientation sensors, a processor, program code for generating the necessary imagery, and the like. Some VR HMD might use other techniques for positioning the HMD and other controllers in a room-scale space.

Conventional VR and avatar animation systems have their uses, but improvements are still desirable.

SUMMARY

An interactive avatar display system provides a computer-generated view of a virtual space including an avatar that moves in the virtual space in response to movements of the user that are sensed by sensors. The number of sensed movements is less than the number of degrees of freedom of avatar movement. The interactive avatar display system computes an array of accelerations to apply to movable body parts of the avatar and computes the array of accelerations by solving equations of motions from mass properties of the movable body parts and an array of forces computed from an array of inverse dynamics force values for the movable body parts and one or both of an array of balance control force values and an array of locomotion control force values, taking into account a set of constraints for the avatar, and possible also environmental objects in the virtual space.

DETAILED DESCRIPTION

Drawings are not necessary for understanding the embodiments described herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The base hardware upon which embodiments will execute can be a VR rig, which might comprise headgear (a head-mounted display, or "HMD") that a user wears on their face and includes visual output viewable by the user when wearing the headgear and instrumented gloves on the user's hands. The VR rig (or more generally, the base hardware) includes a processor, program storage, data storage memory and communications elements, as needed to execute code and perform the functions of the base hardware. Examples of base hardware include the user of handheld VR "controllers" instead of gloves, such as the Oculus Touch™ controller or the HTC Vive™ controller or PSVR's MOVE™ controllers.

The VR rig can have 6 degrees-of-freedom (DOF) motion tracking of the user's head and at least 3 DOF per hand of the hand orientation. Optionally, there is also position tracking for each hand, resulting in 6 DOF per hand. This data is read from VR position tracking sensors and can be stored in memory in a conventional way. In some embodiments, simplified controllers are used that might have only three DOF for hand orientation and none for position. Position sensing is harder to do, but can be done with high-end VR.

In some embodiments, the VR rig can include additional VR position trackers that can be attached to arbitrary body parts of the user, such as knees and feet to provide more comprehensive positional sensory input from bones besides the head and the two hands. In general, "position" tracking can include both translational position and rotational position (also referred to as orientation). Some VR rigs have three orientation trackers and additional trackers can be added, so an avatar might be animated using sensor inputs from 3-6 trackers. Unless otherwise indicated, examples here that use some number of trackers can work with a different number of trackers.

There might also be a separate hardware system that is a development system upon which developers can create the code that the VR rig executes to perform the functions of that VR rig. In the functions described below, the code is executed by the VR rig, but some of those features are created at the development system. The development system would have a developer's user interface, storage for programs such as compilers and development tools, and a communications link over which the development system can send code updates to the VR rig.

In some embodiments, there is a program distribution platform between the development system and the VR rig, whereby the VR rig interacts with the program distribution platform, which may be an online applications delivery store or service, onto which the development system previously loaded a program/app and/or updates thereto.

In some embodiments, the processing portion of the VR rig is separate and is tethered to the HMD via a wire. In some embodiments, the processing portion of the VR rig is separate and communicates with the HMD wirelessly. In some embodiments, the processing portion of the VR rig is embedded inside the headgear. Other variations are possible.

The visual output of the VR rig corresponds to computer-generated imagery of a virtual space defined by objects modeled to be present in the virtual space. For VR effects, the visual output would change as the user moves the headgear so that a scene containing visual objects modeled in the virtual space appears to the user to remain constant in the user's physical reference frame.

A Full Body Avatar

The objects modeled to be present in the virtual space can include a model of a full body avatar for the user of the VR rig. In the more general case, the full body avatar is used in an animation process that can be part of a VR system or other system where the output of the system is a simulation or representation of the avatar moving based on a number of inputs, one of which is movement sensed from a human or other sensed body so that the avatar's animation follows, or is driven by, sensed movements of the human or other body. While the more general case should be understood to apply unless otherwise indicated, many examples herein use a VR rig to illustrate various concepts. In such illustrations and examples, there is a user, usually a human, that has sensored body parts, such as a head wearing a head-mounted display that includes sensors to indicate how the user's head is moving, possibly in translations, rotations, and also has instrumented gloves on the user's hands that include sensors to indicate how the user's hands are moving, possibly in translations, rotations, as well as individual joint movements, such as wrist and finger movements. The processing system, a VR rig or otherwise, is then tasked with using those sensor inputs to animate an articulated character, referred to herein as an avatar.

The animation might occur sometime after the sensor readings are recorded and stored, but often the application has the animation occurring in real-time or near real-time, such as being able to generate the animation at a time delay after the sensor readings where the time delay is one frame of a 60 or 90 frames per second (FPS) video sequence, or the time delay is a small number of frames that is an acceptable delay for the application in which the processing system is used. In some cases, less than 1/90 of a second is available to perform all necessary processing to generate a frame. The animation might be displayed for the user in real-time or near real-time in an interactive system so as to create the impression that the user is animating the avatar by the user's movements and causing the avatar to interact with the environment of the virtual space in which the avatar is animated. The environment may include environmental objects that the avatar interacts with that can represent elements present in the user's real world, such as the floor upon which the user is standing being represented by a floor environmental object that the avatar cannot pass through, and environmental objects might include virtual walls, boxes, balls, tools, etc. that are present in the virtual space but not present in the user's real world space.

As explained herein, the avatar might have many more degrees of freedom than there are sensor readings. For example, sensor readings might only provide an indication of the rotation of the user's head and the rotation and translation of the user's two hands, but the avatar has degrees of freedom for head rotation, rotation of each of two hands, translation of each of two hands, but also translation of torso, elbow, knee, foot placement, leg rotation, etc.

The avatar can be modeled as an articulated character, having body parts such as head, neck, back, pelvis, hips, knees, ankles, feet, shoulders, elbows, wrists and hands. Each body part has positional constraints (e.g., they must stay attached to the other body parts they attach to) and joint limit constraints (e.g., elbows have a limited range of motion).

The full body avatar is represented in memory as a character model. With that character model, there are body parts, each connected to its parent body part using a socket joint, a hinge joint, a universal joint, a prismatic joint, or another joint type. The character model might comprise semi-rigid bodies that have some rigidity (as with bones) and some flexibility (as with skin and muscle). The body parts are each modeled with a nonzero, definable mass (although a few might be modeled with zero mass with no ill effects).

In processing the character model, the base hardware will run a physics engine that will constrain movement of the body parts according to interaction with other body parts, satisfying the constraints and controlling movement of the body parts to also be consistent with the physics of interacting with other physicalized objects in the virtual world.

The hierarchy of the full body avatar might be fixed, so that the VR rig operates on one hierarchy of body parts that doesn't change at run time. In other embodiments, it might be that the user can switch hierarchies. For example, the user can change from a virtual human to a virtual bird or eight-legged creature with corresponding changes in body parts and hierarchy. While the hierarchy might remain the same (e.g., two arms, each connected to respective elbows and both connected to a torso), the sizing of the body parts might change from user to user.

Movement of the full body avatar can be driven by the movement of the real-world head and hands (as determined by the data read from the sensors indicative of movement of the user's head and hands). Typically, the user will expect the movement of the body parts directly under the VR rig's trackers to match the movement of their corresponding user body parts in the real world. However, for the movement of the body parts not directly tracked by the VR rig, an avatar tracking system will determine their positions and orientations to be rendered to the user in the VR display output. The avatar tracking system uses the physical constraints of the avatar character model and other virtual world constraints are used to define the full body avatar. This drives the virtual avatar to follow specific locomotion cycles, track desired poses, and still keep balanced. This can be done by determining and applying certain torques to each joint of the simulated avatar's skeleton.

The ghost hands might be implemented as ghost end effectors corresponding to the head and hands of the user that are tracked by the VR HMD and hand controllers/gloves.

The "ghost hands" technique can be used to reconcile discrepancies between simulated hand positions and the users' real hand positions. The avatar system can render highly detailed hand models in the virtual world at the simulated positions of the hands. At the same time, the ghost hands might be rendered as a less intrusive ghost style that maps 1-to-1 to the end effectors corresponding to the head and hands of the user that are tracked by the VR HMD and hand controllers/gloves.

Full Body Avatar Calibration

In using the VR rig, the user might enter a calibration program that observes user movement in predetermined body movements, computes body part lengths (and possibly other characteristics) for the user's body parts, and updates the character model of the full body avatar with those lengths and characteristics. The VR rig would use that updated character model when simulating the user or some of the user's body parts in the virtual world. Thus, if the user were a tall person, the user's avatar would stand taller in the virtual world and if the user had a smaller arm span, the avatar in the virtual world would have a smaller reach.

In a calibration process, the user is asked to take certain poses. For example:

a) With the user standing with torso upright, legs close together, and arms held forward, straight and horizontal, the VR rig notes the positions of the user's head, hands, etc. from the sensors available for position sensing that are part of the base hardware.

b) With the user standing with torso upright, legs together, upper arms held forward, straight and horizontal stay straight horizontal, and lower arms bent upright, the VR rig notes the positions.

c) With the user standing with torso upright, legs close together, arms drooping naturally along body sides, the VR rig notes the positions.

Other poses might be requested. The requests can be presented to the user on the visual output to follow instructions. The VR rig processor includes program code for calculating approximate relative positions of the avatar joints and having the full body avatar skeleton calibrated to fit the user's body more accurately.

Physics Solver and Multiple Force Arrays

At a high level, the virtual reality systems described herein take in inputs that can be represented by data corresponding to movement of a user's body parts, as measured by virtual reality hardware or other devices. The data often needs to be obtained in near real-time and processed in near real-time, such as within $\frac{1}{90}$th of a second or a few units of $\frac{1}{90}$th of a second, so as to be able to be displayed without a disrupting delay. The movement of the user's body parts can be recorded and referred to as position "tracks" in some coordinate space. From a position track over time, a velocity track can be obtained by differentiation or otherwise and from a velocity track over time, an acceleration track can be obtained by differentiation or otherwise.

A physics engine as described herein can output natural looking movement data (or the animation video itself) using inputs from just a few of the user's body parts. For example, an animated avatar in a virtual reality system might be made to move naturally based on just inputs of movement of the user's right hand, left hand and head while matching (when possible) the avatar's corresponding body parts with those of the user. Other inputs might be provided. As an example, the user might move their instrumented right hand up and to the right in a curving motion. The physics engine would then use that position track as a target to meet with the avatar's right hand. If the user's hand moves far enough that the target is beyond reach for the avatar, the physics engine would then determine how to move other parts of the avatar's body, such as the legs, so that in the virtual reality space, the avatar starts walking so that the right hand can reach the target position (without the avatar hand detaching from the avatar) even though the physics engine does not have inputs as to the movement of the user's legs (which might not even be moving).

In addition to moving the avatar body parts that correspond to the sensored user body parts, e.g., tracking those avatar body parts to the target locations/orientations determined from the user's movements, the physics engine also works to make the avatar's motion to look natural and aligned with how the laws of motion operate in the real world. For example, when the center of mass of the avatar ends up outside the supporting polygon of the avatar (e.g., a polygon on the ground that is a convex hull containing both feet of the avatar), the laws of motion dictate (in the absence of sticky feet) that the avatar should fall over. The physics engine will determine instead that the avatar should shuffle its legs accordingly to regain balance rather than falling over. The processing to determining what rebalancing or shuffling is needed can be done by the physics engine's balance controller to drive the legs to keep balance. While tracking the avatar body parts, there might be a corresponding movement of the avatar's character frame.

The physics engine can include a locomotion controller that, from the tracks of the input VR devices, compute desired linear velocity and angular velocity of the character frame and produce the torques needed to satisfy the determined "locomotion need" of the avatar to match user's high-level locomotion intent. The physics engine described herein can simultaneously satisfy the tracking need, the balance need and the locomotion need to produce an avatar animation that not only looks natural but also matches the user's expectation on where their tracked end effectors should be.

In a prior art approach, the user is sensored with many devices or objects to allow a virtual reality system to perform motion capture ("mocap") for natural looking movements. To capture the full body motion of an actor, the mocap system typically requires significant number of sensors in the magnitude of 20-100 in order to do direct tracking of positions of all the essential body parts of the actor. There is no physics simulation used in the mocap system and only a kinematic approach is used to retarget the tracked motion of the actor's body parts to an abstract skeleton that has similar topology as the actor's humanoid topology. This can be unwieldy, so there are benefits to being able to generate natural looking movements on an avatar that tracks a user's movement from only a few inputs from that user.

Animation uses an articulated skeleton data structure. An articulated skeleton data structure comprises a list of bones, a list of joints where a joint connects two or more bones, joint constraints that specify the allowed range of movement of a joint, often in terms of allowed angles. This articulated skeleton data structure can be considered to be a tree structure. Where animation is done, the animation process obeys the constraints, such that if one bone is connected to another bone by a joint, the bones do not become unconnected and the joint only moves within the allowed range of motion for that joint.

Inverse kinematics (IK) takes in target positions for some body parts and determines what set of joint rotations would result in the avatar's body parts hitting those target positions at the target times. IK is commonly used in avatar animation systems. Where not all body parts are represented in the input data, i.e., their tracks are not part of input, an IK engine can infer where those body parts might be when that other body parts are meeting the target position constraints. But this sometimes looks unnatural.

An IK solver is given a chain of articulated multi joint bone structures and from that and some target positions of the end effector bone, it will compute the intermediate joint rotations of the intermediate joints from the base of the multi joint bone structure to the end effector so that the end effector (the last segment on the chain attached to a hardware position tracker) will track the input position. For example, if the constraint is that a fingertip needs to be at a certain location at a certain time, an IK solver will determine the skeletal pose and position of the bone structures that have the property that the avatar's fingertip is at that location at that certain time, while not violating any geometric constraints required by the intermediate joint types. Limitations of IK-based tracking systems include generation of unnatural poses (e.g., "flipped elbow") because it ignores all the dynamics and physical laws that governs the motion of the underlying skeleton, often it does not interact well with environmental digital objects that are supposed to collide with the result in a physically realistic fashion, and does not handle lower torso movement very well or locomotion such as walking. For example, a common problem of an IK-based VR avatar system is that it does not know where to place the avatar's feet and legs and it either needs to blend key-frame animation of the lower body with an IK-tracked upper body or it will mandate that the avatar's feet are anchored at the ground so it can run IK chains from the anchored feet to the tracked end effectors like hands and head.

An improved avatar animation system and simulation engine can be based on the simulation of a bio-mechanical full body humanoid model of the user. This model is stored in memory including joint constraints (e.g., the leg must remain connected to the hip and the knee), joint limits (e.g., an elbow can bend from 5 degrees to 180 degrees, but not more), and the mass properties and collision shapes of the body parts. For example, a "hinge" joint can model the elbow that allows for solutions with changing angles of the elbow and rotation. The data can also include muscle details, which can be simulated as torques exerted at the joints of the skeleton. The bio-mechanical model of the user is simulated in real-time with ground collision and gravity, together with other dynamically simulated environment objects, such as tables, walls, obstacles, etc. that can interact with the avatar.

When the simulation engine receives a target positions of a limited number of bones (typically 1-6 bones), instead of passing them into the IK solver to guess where the rest of the user bones are located, the engine inputs those target positions into a plurality of force array generators. In some examples, two force array generators are used and in others, more than two are used. The resulting image of the avatar will look more natural in motion and can interact with other simulated environmental objects or avatars of other users in a shared virtual space. The simulation engine processes the targets of the respective bones of the avatar and provides those to the force array generators.

One force array generator uses an inverse dynamics process to compute a force array (the ID force array) representing the forces necessary to be exerted by each controlled virtual muscle of the avatar in order to drive the full body skeleton of the avatar so that the position targets of the tracked bones are met. Depending on the situation, the forces might be torques that virtual muscles apply to certain tendon attachment positions on body parts. Thus, where a force is to be applied at a certain place on a body part, this might be equivalent to a torque being applied at a rotation point of that body part.

Using inverse dynamics, the physics engine can compute an array of forces or torques that would drive the end effectors of the underlying tree structure for the articulated multiple rigid body to match the input positions from the VR/AR sensors attached to the user's body.

Forward dynamics computations consider how, given some accelerations and forces applied to body parts of a skeleton, do those body parts move to new positions and angles. With inverse dynamics, the positions and angles are the inputs and the outputs are the accelerations and/or forces needed to get to those positions and angles using a set of differential equations that yield the position and angle trajectories of the idealized skeleton's limbs from the accelerations and forces applied. Inverse dynamics is used to derive joint moments and accelerations and forces that need to be applied to get to particular position and angle trajectories.

In some embodiments, the physics engine uses a stored representation of data and program code that encodes for equations of motion that are based on Newtonian mechanics, such as the Newton-Euler equations of motion, wherein a force applied to an object and the object's mass times the linear acceleration of the object are equal. Thus, the force needed for a desired acceleration can be computed from a value for the acceleration and the stored mass value, and the acceleration resulting from an applied force can be computed from a value for the force divided by the stored value for the mass of the object. In the Newton-Euler equations, rotation is dealt with by having the moment be equal to the stored mass moment of inertia of the object times an angular acceleration. These equations mathematically model the rigid body bones of the avatar. From these equations, the physics engine uses inverse dynamics to derive a torque (moment) value at each joint based on the movement of the attached bones or bones affected by the joint.

In another embodiment, the physics engine first runs an IK process to compute and store an array of target angles that correspond to the target angular positions of the intermediate joints of the IK chains leading to the end effectors that have target positions (determined by the VR inputs, such as hand tracking) and then the physics engine might compute the ID force array from the array of target angles using a PD controller. For example, the physics engine might compute Torque(i)=Kp(i)*(TargetAngle(i)−CurrentAngle(i))+Kd* (TargetAngularVelocity(i)−CurrentAngularVelocity(i)), where Torque(i) is the i-th value in the ID force array, TargetAngle(i) is the i-th value in the array of target angles computed by the IK process, CurrentAngle(i) is the i-th value in an array of current orientations of the joints. Values for the TargetAngularVelocity and the CurrentAngularVelocity can be computed by differencing the target angles and current angles of the joints. Kp(i) and Kd(i) are PD controller constants that represent the stiffness and damper terms of PD controllers used to generate the ID torques at the joints.

In another embodiment, the physics engine runs a single PD controller at the end effector to compute the desired torques/forces at the end effector in order to track the position and orientation of the VR input track and then uses a Jacobian transpose transform process to compute the torques needed at all the intermediate joints in order to induce the desired force and torque at the end effector computed by the PD controller.

Another force array generator derives implied locomotion speed and direction heading of the avatar from the tracked positions and uses a locomotion control process to compute the torques necessary to mobilize the avatar to move at the desired speed in the desired direction without losing its balance and move naturally. One embodiment of such locomotion force array generator uses an inverted pendulum process to generate the desired leg swing angles to match the locomotion needs and then runs the ID process described above to compute the set of torques needed to drive the legs to the desired angles to satisfy the locomotion need.

Yet another force array generator uses a balancing control process to compute balance the forces necessary to keep the avatar torso upright and thus balanced on its feet. One embodiment of the balance force array generator searches the joints to find joints that connect a torso to limbs and computes a net aggregated torque on the torso exerted by these joints by summing up the ID force array and locomotion force array for these joints computed in earlier steps. Then the balance force array generator can use a PD controller to compute the desired net balance torque Td via Td=Kp*(Desired Orientation of Torso−Current Orientation of Torso)+Kd*Angular Velocity of Torso where Kp and Kd are the PD controller constants. Then the generator will subtract the current net torque on the torso exerted by ID force array and locomotion force array from the desired net balance torque Td to get the missing torque Tm on the torso in order to achieve balance. Finally the generator will apply the missing torque Tm on the torso by. allocateing Tmover the joints connecting the torso to the limbs.

A solver then combines multiple, separately determined, force arrays into one force array, such as by using two or three of those force array generators described. Other forces can then be easily added, such as contact forces, gravity, etc. The solver then attempts to find an array of acceleration values that solves the equation of motion F=ma for the body parts, knowing the masses, that also solves an equation of constraints C(a)=0 for the physical constraints, such as contact constraints, joint constraints, motor constraints, etc. that are configured on the avatar and the other environment objects.

With the array of acceleration values known, and having stored values for position and velocity of prior frames, the simulation engine can use the acceleration values with the rigid body system and integrate the acceleration for one time step forward to get new velocity values and further integrate the velocity values to get new position values of the avatar body parts and other dynamics objects in the simulated environment.

This process can repeat for each clock cycle, typically corresponding to a video frame or a set number of video frames.

The simulation engine can be used in movie pre-visualization applications, where actors are wearing low cost VR/AR devices to quickly act out different scenes in a digital environment. The simulation engine can provide digital representations of the actors that move more naturally and interactive in the digital environment without using costly motion capture equipment.

The simulation engine can be used for medical or training applications, where the simulated avatar not only tracks a user's input tracker positions but also might display biomedical information such as the joint stresses and pressure distribution of the avatar under different styles of motions.

In some embodiments, a reduced version of a VR/AR avatar tracking system only simulates a partial skeleton of the user instead of the full-body skeleton. In some embodiments, the VR/AR avatar tracking system translates from user movements to non-humanoid avatar characters, such as animals, robots or machines. While the avatar might not have a one-to-one correspondence with the user's body shape and skeleton, the connection can be made to a partial or abstract one. The avatar tracking system can be used to retarget input motion across asymmetrical body shapes and scales as well.

In some AR and MR applications, the avatar tracking system includes a full body or partial body rendering or imaging of the user on the simulated avatar.

The avatar tracking system can also be used as a low cost, lightweight and real-time motion capture ("mocap") substitute system for animators to make realistic key-frame animations.

Figure 1:
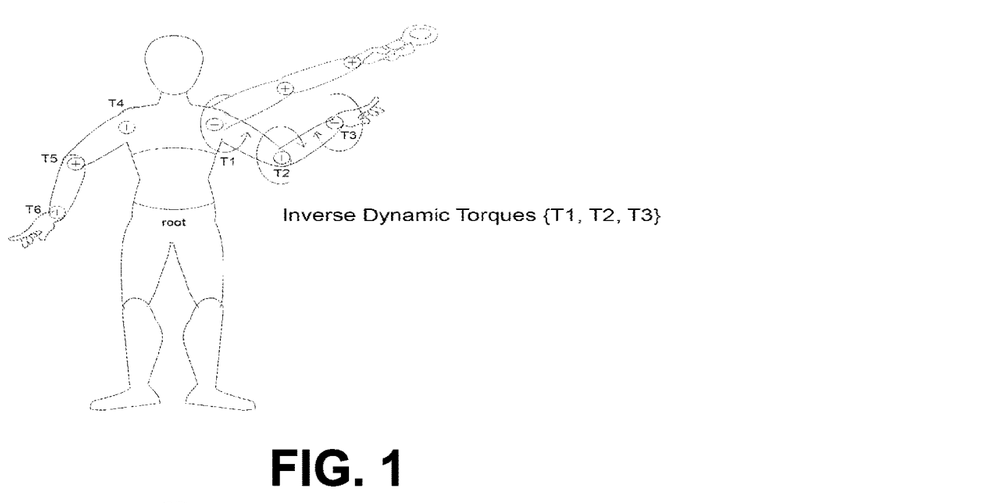
FIG. 1 illustrates inverse dynamic torques.

FIG. 1 shows an example of what the inverse dynamic torques represent. They can be computed to drive the three right arm joints (shoulder, elbow, wrist) for the right hand to reach the target controller's position and orientation. There can be additional torques on other tracking limbs, such as left arm, neck, and legs to track more end effectors towards the VR position trackers attached to the corresponding body parts.

Figure 2:
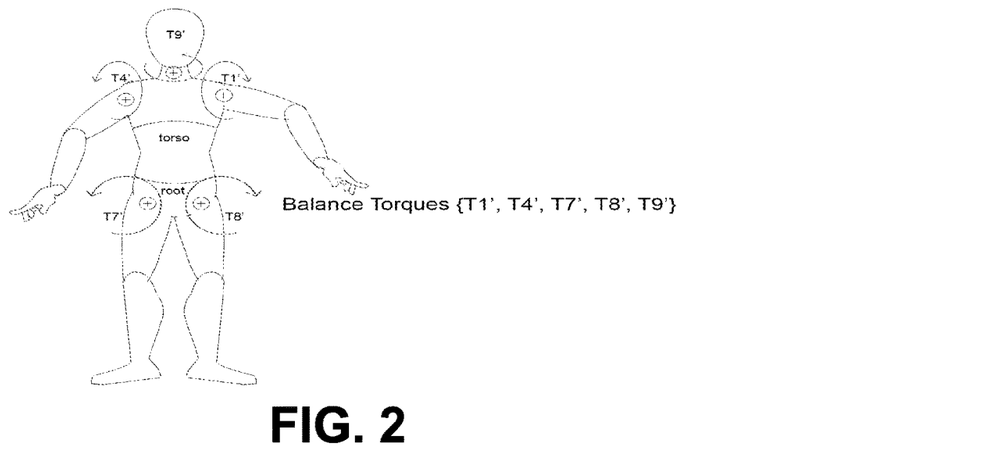
FIG. 2 illustrates balance torques applied to a main body frame.

FIG. 2 shows an example of balance torques applied to a main body frame (here, comprising the torso and the root bones) in order to maintain an upright orientation of the humanoid's main body frame. In this illustration, torques T1, T4, T7, T8, and T9 have the most significant impacts on holding the body frame upright. The output of the balancer control process can be these set of torques applied to these joints that impact the body frame upright direction.

Figure 3:
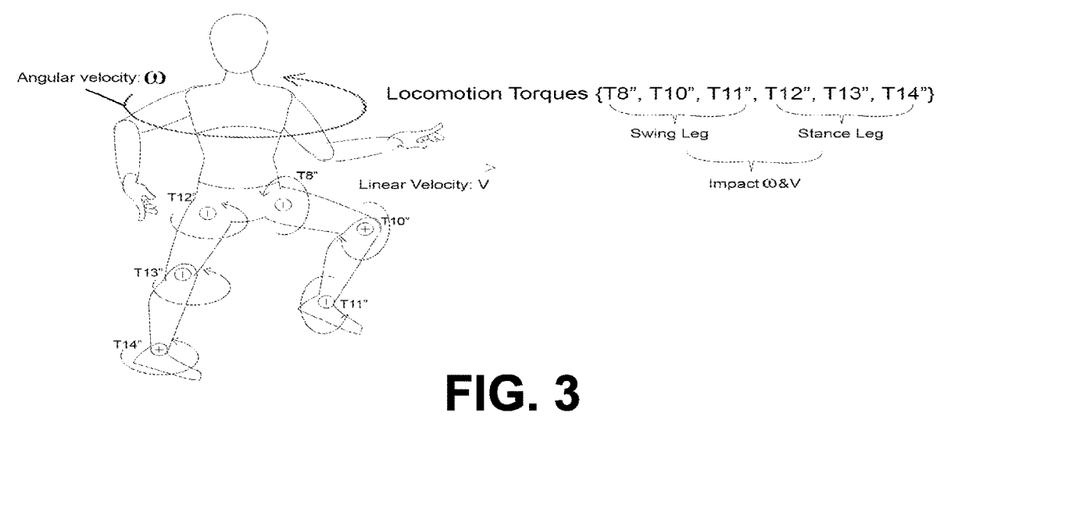
FIG. 3 illustrates locomotion torques.

FIG. 3 shows an example of locomotion torques. These are mostly concentrated on lower body torques on the two legs (swing legs and stance legs). These torques impact the shape and swing direction of the swing leg that plays important role in the linear velocity of the overall character. The torques on the stance leg (including stance hip joint, knee joint, ankle joint) determine the turning velocity, which is the angular velocity, of the character and they impact the linear velocity as well. Overall, the locomotion controller's output is the force array for the lower body joints to drive the overall character to the desired linear and angular velocity.

Figure 4:
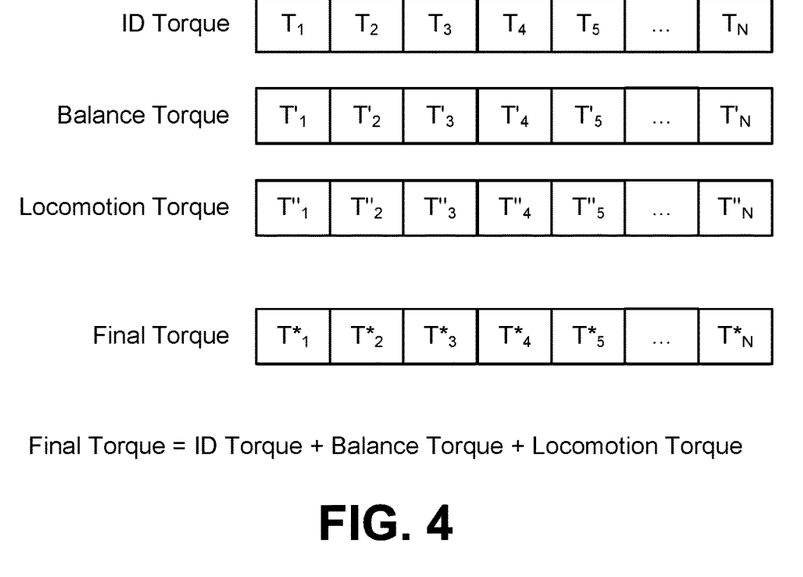
FIG. 4 illustrates summation by components of force array vectors.

FIG. 4 illustrates the summation by components of force array vectors.

Figure 5:
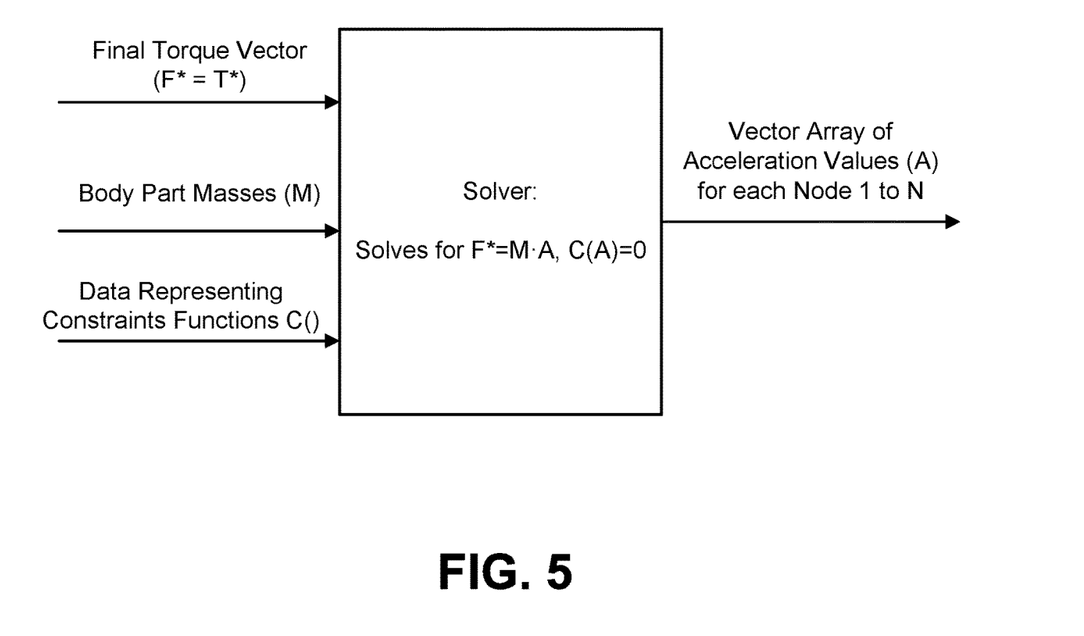
FIG. 5 illustrates a solver for solving for the summed force array vectors and constraints.
Figure 6:
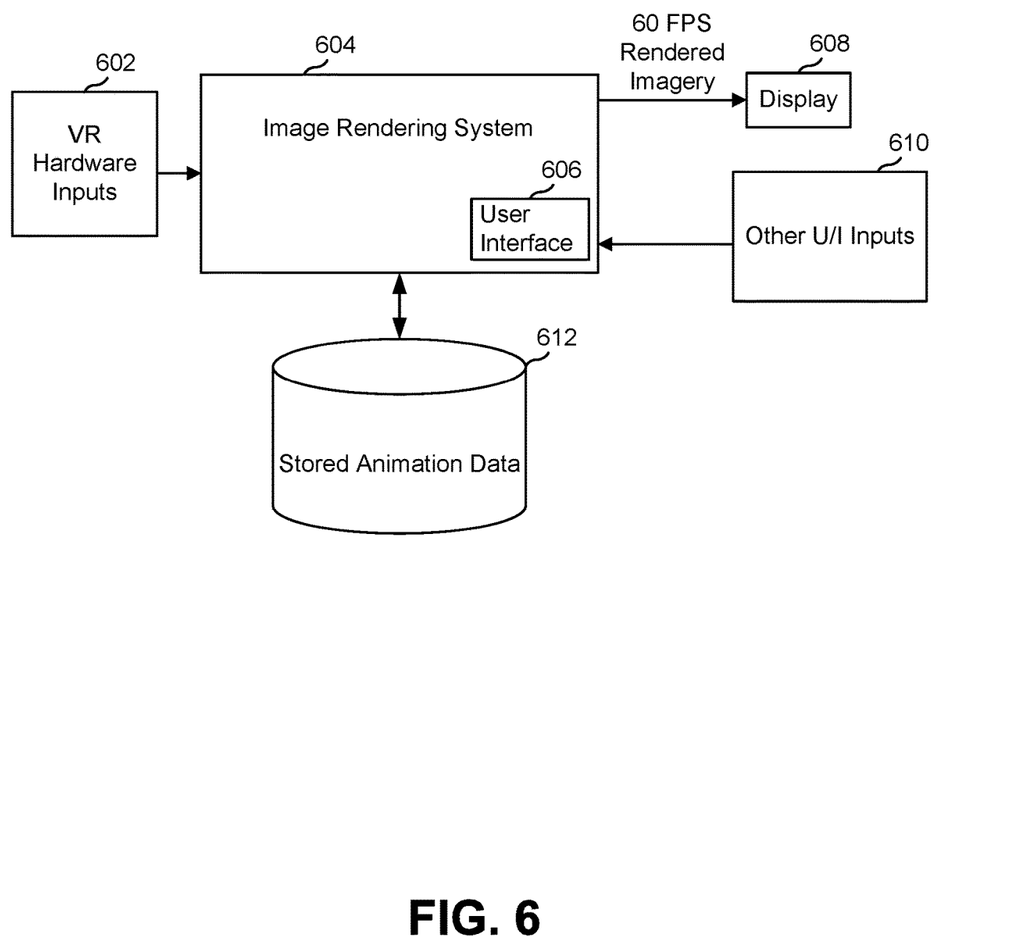
FIG. 6 illustrates a VR system that uses a physics engine for interaction with a user.

FIG. 5 illustrates a solver that would solve for the summed force array vectors and constraints, to solve a system of equations for A (the acceleration matrix that includes the acceleration vector of every joint), given F, M (represented by a mass property matrix including mass and moment of inertias of all the bones), C (constraint function for contact constraints and joint constraints in the system). This allows for simple combination of ID, balancing controller, locomotion controller or some subset to do VR/AR avatar tracking.

In some embodiments, the ID module is required.

Ghost Hands

In some embodiments, the movement of the full body avatar uses the ghost hands instead of the virtual hands of the avatar. For example, movement of the avatar (e.g., joint rotations for the desired pose) uses the positions of the ghost hands rather than the positions of the virtual hands. With those positions, conventional character control can be performed, such as using inverse kinematics or inverse dynamics across update ticks and then using the desired pose to derive required joint torques.

The VR rig models the full body avatar and with the physics engine, the elements of the character model move consistent with the physics constraints of the virtual space, such as where the user's hand movement might result in movement of the avatar's torso subject to constraint by other objects in the virtual world. However, there might be some virtual world constraints that are not present in the physical world, such as a virtual brick wall where the user can move their hand to a position through the brick wall.

The avatar hands appear in the visual output (when they are in camera view) positioned based on the user's physical hand movements, captured by real-world 3 DOF or 6 DOF motion tracking devices, such as in the gloves of the base hardware. The avatar hands are moved subject to constraints of the virtual space, such a constraint that a hand cannot move through a solid object. Where the positions of the user's real-world hands and the avatar hands diverge (such as due to virtual world constraints that do not have real-world counterpart constraint), the virtual hands are displayed at the constrained position and the visual output includes a "ghost hand" displayed at a position in the virtual world that corresponds to the real-world hand position. This can be done for both hands. Thus, the ghost hands reflect the user hand's actual position and orientations.

The ghost hands are not constrained by objects and might be rendered as being translucent, while the virtual hands are non-translucent and follow the constraints of collisions with other objects. The position of the ghost hands and the virtual hands would diverge if the virtual hands encounter an object in the virtual space where the user's hands do not encounter an object in the real world. In the example where the user punches the virtual hands at a solid wall, if the user's hands can continue moving past that point of collision, the ghost hands would continue forward and appear on the other side of the solid wall. Since they are translucent, they do not obscure the view entirely. They can also be rendered without intervening objects, so that the user can see the ghost hands even if they are behind the solid object or other objects.

The divergence can be handled in a number of ways. One way would be to constrain all body parts and have the virtual hand stop just at the point of collision. This would look to the user like the virtual hand is at the wall, the ghost hand is beyond the wall and the virtual elbow (and possibly other body parts that have virtual/constrained and ghost/unconstrained counterparts) is somewhat behind the ghost elbow (so that a constraint on the length of a lower arm body part is satisfied in both cases). Another approach is to relax some constraint so that the virtual lower arm is not necessarily parallel to the ghost lower arm.

In another approach, there are no ghost body parts other than disembodied ghost hands. In that case, there is no need to consider or render other body parts or consider joint constraints. Using an inverse kinematics/dynamics controller, the ghost hand might be treated as a target for the virtual hand so that the torques on the arm joints generated by the controller try to drive the virtual arm to certain pose to follow the ghost hand but at the same time the virtual hand collides with the wall thus received forces from the wall and the force is propagated across the whole avatar skeleton. The final behavior is simulated by the physics engine. If the wall fails to provide enough friction to counterbalance the joints' torques, the virtual hand will move along the surface of the wall, otherwise the virtual hand will stay at the hand-wall contact location.

Some small latency is tolerable between the ghost hands and real-world hand positions. The ghost hands preferably appear in front of other objects in the virtual world. This can reduce ill effects, such as motion sickness. So, if there is an object obscuring the virtual world hands, the ghost hands would still show through the obscuring object. Thus ghost hands are preferably rendered different than other objects so that they are always visible rather than being blended into the virtual world.

The ghost hands can be modeled as kinematic objects with collision between other virtual world objects disabled to ensure ghost hands don't interact with other objects. Thus, while the ghost hands follow data captured by real-world motion sensors, the dynamic (visible, virtual) hands obey physical laws in the virtual world, such as collisions with surfaces. Ghost hands might also be referred to as "kinematic hands" that kinematically track hand controller positions and are not physically simulated.

Diversion of Avatar from Real-world Position; Switch from First Person to Third Person In the VR rig's visual output, the character model appears as a first person. For example, in the first person view, the viewpoint of the camera in the virtual space corresponds to where the user's head and eyes are and therefore, the torso of the character model (which is attached to the avatar's head) would remain in the virtual space just below the camera. If the torso is struck in the virtual world by another character or object with sufficient force, the VR rig would, according to the output of the physics engine, move that torso in the direction of the force, which would then move the body parts that are attached to the torso, which would include the head and therefore the camera position. This can be quite disorienting to the user.

To deal with cases where the base hardware determines that the forces on the avatar are such that the avatar's head will move more than some threshold or otherwise determined to be undesirable to present to the user as a camera movement, the base hardware is programmed to unlink the camera position from the avatar head position. When that happens, the user will see the avatar on the visual output in the third person. Thus, when the avatar gets hit with sufficient force that the physics engine determines that the avatar should fall to the ground, the avatar appears to fall, but the user's viewpoint does not swivel and fall to the ground.

The response can be a gradual relinking of the avatar head to the camera position. For example, where there is a nudge, the avatar's head might move ahead of the camera position and the user could see the back of their own avatar's head, but then the virtual head would move back into its prior position thus realigning with the camera position. In some cases, such as a fall, the camera position might be what moves, such as slowly trending toward the avatar head position or a single discontinuous change of the camera position that might be interpreted by the user as switching from one camera to another. Once the avatar head position and the camera position are realigned, they can then be linked again so that the full body avatar is then perceived in the first person.

Grabbing/Throwing Joint

The physics engine operates on models of objects that are present in a virtual space, such as making sure that when objects collide, they then move and are accelerated consistent with presumed forces of the collision, subject to constraints such as objects being attached to other objects (e.g., a hand remains attached to an arm) and the mass assigned to the object. An object can be "grabbed" in the virtual space by, for example, surrounding the object with finger objects of a virtual hand. Merely relying on the physics engine constraints can prove delicate for the user for various reasons, making it difficult for a user to manipulate the VR rig through the motions needed to effect a grabbing and throwing action in the virtual space. This is especially the case where there is little or no haptic feedback to the user signaling a grasping of the object.

To simplify grabbing and throwing operations, while still providing natural-looking interactions, when "attachment conditions" are present, a new joint is added that keeps the hand and the grabbed/thrown object attached to the hand. With the attachment, the physics engine will ensure that the object stays in the hand, much the same way as the physics engine ensures that the arm stays attached at the shoulder. An example of an attachment condition is where the fingers of the hand are touching the object, the object also touches the palm of the hand and the fingers are closing.

When "detachment conditions" are present, the joint is removed. An example of a detachment condition is that the hand is moving at a minimum speed or greater and the fingers are opening. Thus, for the user to effect the virtual throwing of a virtual ball, the initial grab would secure the ball to the hand, and after the user has done a windup and a throwing motion, the joint goes away and then the physics engine would provide the path for the thrown object as it takes on momentum from the hand and separates, which represents a natural throwing motion.

The joint need not provide infinite impulse to maintain the connection and thus can be broken in physically plausible way. Throwing can happen naturally when the joint breaks as a result of physics simulation or can be controlled programmatically by being hooked up to application events.

In the latter circumstance, the joint is removed and new linear and angular velocities can be set for the grabee.

Weapon Wielding

Weapon can be modeled as a one-piece object and attached to a virtual hand through one or multiple joints. Alternatively, the weapon can be modeled as multi joint soft body such as "3 segment stick" and attached as part of the avatar skeleton. In that latter case, when the weapon hits targets in the virtual world, the impact is distributed across all in-weapon joints and the joints between the weapon and the virtual hand. The force is then propagated across the wrist, arm, shoulder and torso. This way, the weapons and the avatar interact with virtual world objects physically without breaking the illusion of presence. The weapon collision could provide some divergence for the virtual hand and the ghost hand, but with the force realistically propagated across other body parts, the divergence is reduced.

In some embodiments, weapons are rigidly attached to dynamic hands. In other embodiments, weapons are connected to dynamic hands with dynamic joints that can bend. The latter can help shock absorption during impacts.

Hardware Implementation

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Various forms of media may be involved in carrying one or more sequences of one or more instructions to the processor for execution. For example, the instructions may initially be carried on a magnetic disk or solid state drive of a remote computer. The remote computer can load the instructions into its dynamic memory and send the instructions over a network connection. A network interface local to the computer system can receive the data. The bus carries the data to the main memory, from which the processor retrieves and executes the instructions. The instructions received by the main memory may optionally be stored either before or after execution by the processor.

The VR system might include base hardware, such as a headgear, instrumented gloves, a processor, memory and cabling or wireless connections for transferring data and/or power among those parts. Communication might be two-way data communication coupling to a network link that is connected to a local network or an internal channel. Wireless links may also be implemented.

The network link typically provides data communication through one or more networks to other data devices. For example, the network link may provide a connection through the local network to a host computer or to data equipment operated by an Internet Service Provider (ISP). In this manner, the VR rig might obtain updates and programming, as well as provide upload information. The computer system can send messages and receive data, including program code, through the network(s), the network link and the communication interface. In the Internet example, a server might transmit a requested code for an application program through the Internet, directly or via an application store. The received code may be executed by a processor to implement functions attributed to the VR rig herein. That code might be created at a development station by a scene designer and/or programmer.

Figure 7:
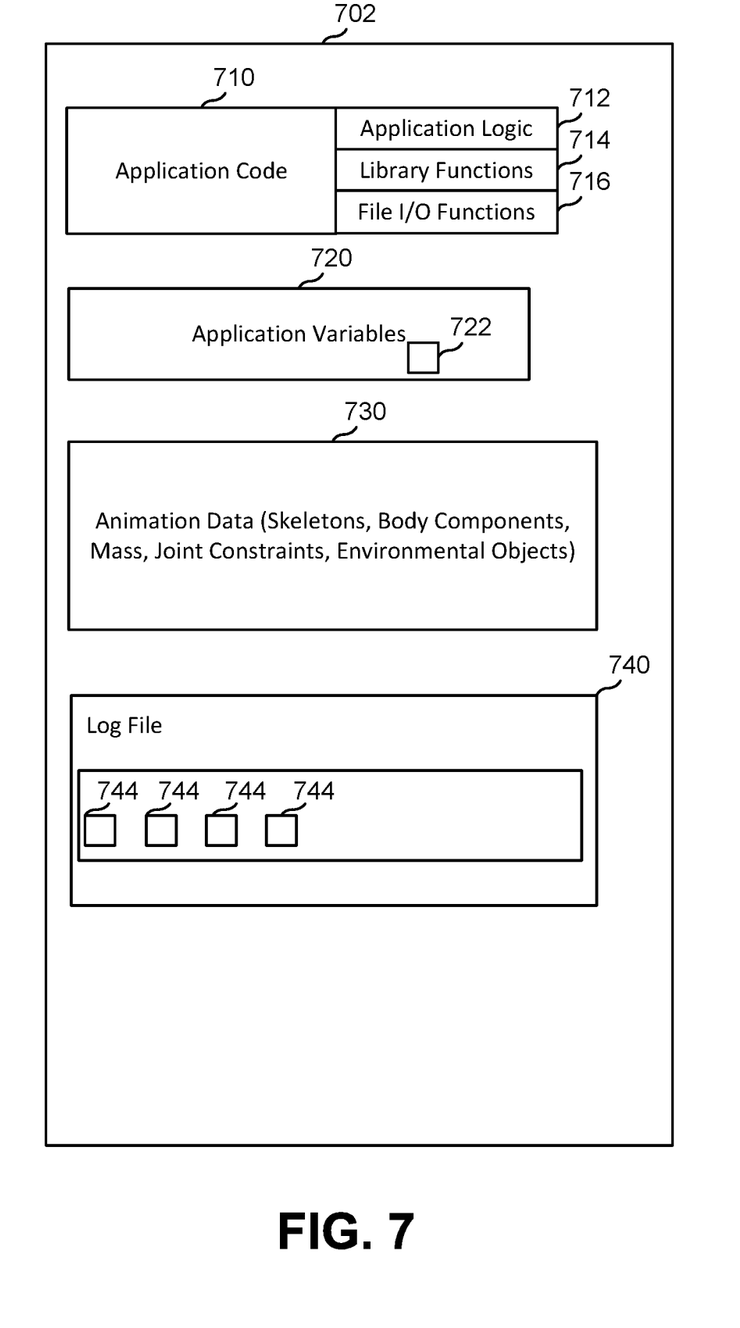
FIG. 7 illustrates structures that might be used by a processor to perform functions described herein.

FIG. 7 illustrates structures that might be used by a processor to perform functions described herein and used by the processor to implement elements of the embodiments described herein. For example, where a functional block is referenced, it might be implemented as program code stored in memory. FIG. 7 is a simplified functional block diagram of a storage device 702 having an application that can be accessed and executed by a processor in a computer system. The application can one or more of the applications described herein, running on servers, clients or other platforms or devices and might represent memory of one of the clients and/or servers illustrated elsewhere. Storage device 702 can be one or more memory devices that can be accessed by a processor and storage device 702 can have stored thereon application code 710 that can be configured to store one or more processor readable instructions. The application code 710 can include application logic 712, library functions 714, and file I/O functions 716 associated with the application.

Storage device 702 can also include application variables 712 that can include one or more storage locations configured to receive input variables 714. The application variables 712 can include variables that are generated by the application or otherwise local to the application. The application variables 712 can be generated, for example, from data retrieved from an external source, such as a user or an external device or application. The processor can execute the application code 710 to generate the application variables 712 provided to storage device 702.

Application variables 720 might include operational details needed to perform the functions described herein. Animation data 730 might include details such as the elements of an articulated character skeleton, body components, masses of elements, joint constraints, environmental objects and other details needed.

One or more memory locations can be configured to store device data 722. Device data 722 can include data that is sourced by an external source, such as a user or an external device, including recorded user VR inputs.

Storage device 702 can also include a log file 740 having one or more storage locations 744 configured to store results of the application or inputs provided to the application. For example, the log file 740 can be configured to store a history of actions.

Figure 8:
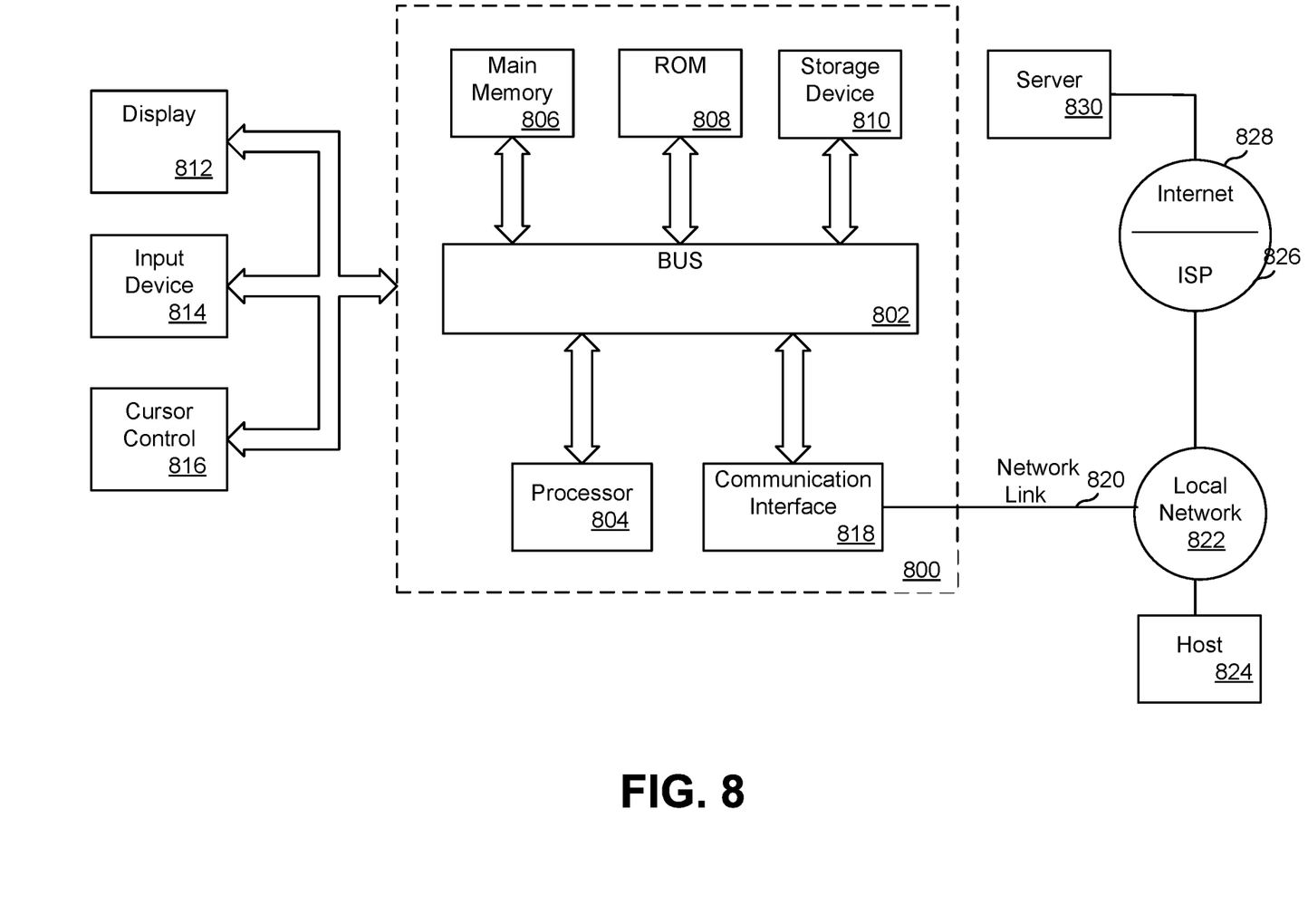
FIG. 8 illustrates an example of a computer that might be used for performing processes described herein.

FIG. 8 illustrates an example computer system 800. As illustrated there, a computer system 800 includes a bus 802 or other communication mechanism for communicating information, and a processor 804 coupled with bus 802 for processing information, such as data and program instructions provided to the processor 804. Processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a computer monitor or VR headset, for displaying information. An input device 814 is coupled to bus 802 for communicating information and command selections to processor 804 and may be in the form of VR inputs. Another type of user input device is cursor control 816, such as a mouse, a trackball, or cursor direction keys for communicating direction information and command selections to processor 804 and for controlling cursor movement on display 812.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network connection. A modem or network interface local to computer system 800 can receive the data. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822.

Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

As has now been described, the present disclosure provides for making and using an interactive avatar display system providing at least a visual output on a device that is viewable by a user, wherein the visual output is a computer-generated view of a virtual space from a camera position and a camera angle, the computer-generated view including an avatar that moves in the virtual space in response to movements of the user, the interactive avatar display comprising: a processor, a program memory, coupled to the processor, containing program instructions for execution by the processor, a data memory, coupled to the processor, for storing data accessible by the processor, sensors for sensing a plurality of user body part positions in a real-world coordinate system of the user. The program memory might comprise a) program code for determining positions and orientations of the tracked body parts from sensor outputs, wherein a tracked body part is a user body part that affects one or more of the sensors, b) program code for generating motion targets of tracked elements of the avatar, wherein a motion target is a position or orientation in the virtual space corresponding to a position or orientation in the real-world coordinate system of the user of one or more of the tracked body parts, c) program code for computing a first array of force values, wherein a force value in the first array is an inverse dynamics force value that corresponds to a force on a particular avatar body part and the first array corresponds to inverse dynamics force values of a plurality of avatar degrees of freedom, including at least one degree of freedom that is unspecified by the motion targets, d) program code for computing a second array of force values, wherein a force value in the first array is either a balance control force value or a locomotion control force and the second array corresponds either to balance control forces needed to maintain a balance of the avatar in the virtual space or locomotion control forces needed to move the avatar as a whole to maintain alignment of the tracked elements of the avatar given the motion targets, e) program code for combining the first array and the second array into a summed force array, f) program code for determining a set of constraints for the avatar, g) program code for computing a solution to equations of motions of elements of the avatar given the summed force array and the set of constraints for the avatar, wherein the solution comprises an array of accelerations wherein an acceleration value in the array of accelerations is an acceleration to be applied to a particular avatar body part as a rigid body system, and program code to update positions and/or velocities of the avatar body parts based on the array of accelerations.

In some embodiments, they include one or more of advancing a simulation clock, generating a video frame output, and repeating with the program code for determining positions and orientations of the tracked body parts from sensor outputs, combining arrays of forces comprises component-by-component addition, program code for computing both the second array of force values and a third array of force values for balance control force values and locomotion control force values, wherein the program code for combining the first array and the second array into a summed force array also combines the third array into a summed force array. The summed force array may include contributions from simulated gravity forces and/or interactions of the avatar and/or contributions from interactions with environmental objects and/or other avatars.

The set of constraints might comprise one or more of physical constraints, contact constraints, joint constraints, and/or motor constraints.

A virtual reality system can provide at least a visual output on a device that is viewable by a user, wherein the visual output is a computer-generated view of a virtual space from a camera position and a camera angle, and wherein the visual output varies with head movements of the user to create an appearance that a virtual coordinate system of the virtual space is stationary with respect to a real-world coordinate system of the user, the virtual reality system comprising: a processor, a program memory, coupled to the processor, containing program instructions for execution by the processor, a data memory, coupled to the processor, for storing data accessible by the processor, sensors for sensing positions of a plurality of user body parts in the real-world coordinate system, and the program memory comprising: a) program code for creating a full body avatar in the virtual space, the full body avatar corresponding to a plurality of avatar body parts sufficient to represent movement of the full body avatar corresponding to movement of the plurality of user body parts sensed by the sensors, and b) program code for determining movement and/or positions of one or more of the plurality of avatar body parts according to joint constraints and physics constraints defined as to those one or more of the plurality of avatar body parts and according to sensed movements of one or more of the plurality of user body parts.

The plurality of avatar body parts might comprise a head, a neck, a back, a pelvis, hips, knees, ankles, feet, shoulders, elbows, wrists and hands. The joint constraints might be defined by a hierarchical tree graph structure of avatar body parts wherein edges of a graph correspond to joints between two avatar body parts and each joint comprises a socket joint, a hinge joint, or a universal joint. The virtual reality system might have sizes for avatar body parts are determined from calibration data with the calibration data corresponding to estimates of actual sizes of corresponding parts of the plurality of user body parts, and program code for requesting a specific pose of the user, program code for recording sensor data when the user is in the specific pose, program code for computing the sizes for the avatar body parts based on the sensor data, and program code for storing computed sizes as avatar body part sizes for use in animating the avatar body parts.

A virtual reality system can provide at least a visual output on a device that is viewable by a user, wherein the visual output is a computer-generated view of a virtual space from a camera position and a camera angle, and wherein the visual output varies with head movements of the user to create an appearance that a virtual coordinate system of the virtual space is stationary with respect to a real-world coordinate system of the user. The virtual reality system might comprise a processor, a program memory, coupled to the processor, containing program instructions for execution by the processor, a data memory, coupled to the processor, for storing data accessible by the processor, sensors for sensing positions of a plurality of user body parts in the real-world coordinate system. The program memory might include a) program code for computing trajectories of user hands based on sensor data, b) program code for determining locations of virtual hands in the virtual space corresponding to the trajectories of the user hands, c) program code for determining whether matching trajectories of the virtual hands to the trajectories of the user hands would violate a constraint of the virtual space, and d) program code for displaying a representation of the virtual hands at the locations of the virtual hands and a distinct representation of the virtual hands at an unconstrained position, wherein the unconstrained position is where the virtual hands would be in the virtual space if they were aligned with the trajectories of the user hands with the constraint of the virtual space removed.

The constraint of the virtual space might be a constraint that solid objects cannot penetrate other solid objects. The distinct representation might be a representation of the virtual hands at the unconstrained position shown translucently and visible through any intervening objects of the virtual space that are between the camera position and the unconstrained position.

A virtual reality system might provide at least a visual output on a device that is viewable by a user, wherein the visual output is a computer-generated view of a virtual space from a camera position and a camera angle, and wherein the visual output varies with head movements of the user to create an appearance that a virtual coordinate system of the virtual space is stationary with respect to a real-world coordinate system of the user. The virtual reality system might include a processor, a program memory, coupled to the processor, containing program instructions for execution by the processor, a data memory, coupled to the processor, for storing data accessible by the processor, sensors for sensing a plurality of user body parts positions in the real-world coordinate system. The program memory might include a) program code for determining virtual forces on avatar body parts, b) program code for presenting, in the visual output, the avatar body parts from a first person perspective for the user, wherein in the first person perspective, a camera position for which a scene of the virtual space is rendered is aligned with an eye position of an avatar head, c) program code for determining whether the virtual forces would move the avatar head more than a threshold amount, and d) program code for unlinking the camera position and the eye position of the avatar head.

The virtual reality system might include program code for displaying avatar body parts in the visual output when those avatar body parts are within a camera view, and/or program code for realigning and relinking the camera position and the eye position of the avatar head.

The realigning might be a contiguous process, or a step process with a discontinuous movement of the camera position.

A virtual reality system might provide at least a visual output on a device that is viewable by a user, wherein the visual output is a computer-generated view of a virtual space from a camera position and a camera angle, and wherein the visual output varies with head movements of the user to create an appearance that a virtual coordinate system of the virtual space is stationary with respect to a real-world coordinate system of the user. The virtual reality system might include a processor, a program memory, coupled to the processor, containing program instructions for execution by the processor, a data memory, coupled to the processor, for storing data accessible by the processor, sensors for sensing a plurality of user body parts positions in the real-world coordinate system, and the program memory comprising: a) program code for determining whether attachment conditions are present, b) program code for modifying an avatar character model to insert a new joint between a hand and a gripped object, c) program code for determining whether detachment conditions are present, and d) program code for modifying the avatar character model to delete the new joint between the hand and the gripped object.

All references, including publications, patent applications, and patents, cited herein are hereby incorporated by reference to the same extent as if each reference were individually and specifically indicated to be incorporated by reference and were set forth in its entirety herein.

What is claimed is:

1. An interactive avatar display system providing at least a visual output on a device that is viewable by a user, wherein the visual output is a computer-generated view of a virtual space from a camera position and a camera angle, the computer-generated view including an avatar that moves in the virtual space in response to movements of the user, the interactive avatar display system comprising:
   a processor;
   a data memory, coupled to the processor, for storing data accessible by the processor;
   sensors for sensing a plurality of user body part positions, in a real-world coordinate system of the user, of tracked body parts; and
   a program memory, coupled to the processor, containing program instructions for execution by the processor, and the program memory comprising:
   a) program code for determining positions and orientations of the tracked body parts from sensor outputs, wherein a tracked body part is a user body part that affects one or more of the sensors;
   b) program code for generating motion targets of tracked elements of the avatar, wherein a motion target is a position or orientation in the virtual space corresponding to a position or orientation, in the real-world coordinate system of the user, of one or more of the tracked body parts, and wherein at least one body part of the avatar is an untracked avatar body part that corresponds to a body part untracked by the sensor outputs;
   c) program code for computing a first array of force values, wherein a force value in the first array of force values is an inverse dynamics force value that corresponds to a force on a particular avatar body part of avatar body parts that corresponds to a particular tracked body part wherein the first array of force values are such that when applied to drive the avatar body parts, they drive the particular avatar body part towards alignment with the motion targets of the tracked body parts and the first array of force values corresponds to inverse dynamics force values of a plurality of avatar degrees of freedom, including at least one degree of freedom that is unspecified by the motion targets and thus independent of the tracked body parts;
   d) program code for computing a second array of force values, wherein a force value in the second array of force values is either a balance control force value or a locomotion control force value and the second array of force values corresponds either to balance control forces needed to maintain a balance of the avatar in the virtual space or locomotion control forces needed to move the avatar as a whole to (1) maintain alignment of the tracked elements of the avatar with the motion targets corresponding to the position or the orientation of the one or more of the tracked body parts and (2) move the untracked avatar body part consistent with the second array of force values;
   e) program code for combining the first array of force values and the second array of force values into a summed force array, wherein a summed force in the summed force array represents a combination of (1) the force value in the first array of force values that is the inverse dynamics force value that corresponds to the force on the particular avatar body part, and (2) the force value in the second array of force values that is either the balance control force value or the locomotion control force value;
   f) program code for determining a set of constraints for the avatar;
   g) program code for computing a solution to equations of motions of elements of the avatar given the summed force array and the set of constraints for the avatar, wherein the solution comprises an array of accelerations wherein an acceleration value in the array of accelerations is an acceleration to be applied to a particular avatar body part as a rigid body system; and
   h) program code to update positions and/or velocities of the avatar body parts based on the array of accelerations.

2. The interactive avatar display system of claim 1, further comprising:
   advancing a simulation clock;
   generating a video frame output; and
   repeating determining positions and orientations of the tracked body parts from sensor outputs.

3. The interactive avatar display system of claim 1, wherein combining arrays of forces comprises component-by-component addition.

4. The interactive avatar display system of claim 1, further comprising:
   program code for computing a third array of force values, wherein the second array of force values comprises balance control force values and the third array of force values comprises locomotion control force values; and
   program code for computing the summed force array as sums of the first array of force values, the second array of force values, and the third array of force values.

5. The interactive avatar display system of claim 1, wherein the summed force array includes contributions from simulated gravity forces.

6. The interactive avatar display system of claim 1, wherein the summed force array includes contributions from interactions of the avatar.

7. The interactive avatar display system of claim 6, wherein the summed force array includes contributions from interactions with environmental objects and/or other avatars.

8. The interactive avatar display system of claim 1, wherein the set of constraints comprises one or more of physical constraints, contact constraints, joint constraints, and/or motor constraints.

9. The interactive avatar display system of claim 1, wherein the second array of force values comprises balance control force values and the second array of force values corresponds to balance control forces needed to maintain the balance of the avatar in the virtual space.

10. The interactive avatar display system of claim 1, wherein the second array of force values comprises locomotion control force values and the second array of force values corresponds to locomotion control forces needed to move the avatar as a whole and move the untracked avatar body part consistent with the second array of force values.

11. A virtual reality system providing at least a visual output on a device that is viewable by a user, wherein the visual output is a computer-generated view of a virtual space from a camera position and a camera angle, and wherein the visual output varies with head movements of the user to create an appearance that a virtual coordinate system of the virtual space is stationary with respect to a real-world coordinate system of the user, the virtual reality system comprising:

a processor;

a data memory, coupled to the processor, for storing data accessible by the processor;

sensors for sensing positions of a plurality of user body parts, in the real-world coordinate system, of tracked body parts; and a program memory, coupled to the processor, containing program instructions for execution by the processor, and the program memory comprising:

a) program code for creating a full body avatar in the virtual space, the full body avatar corresponding to a plurality of avatar body parts sufficient to represent movement of the full body avatar corresponding to movement of the plurality of user body parts sensed by the sensors and at least one body part of the full body avatar that is an untracked avatar body part that corresponds to a user body part untracked by the sensors;

b) program code for computing a first array of force values, wherein a force value in the first array of force values is an inverse dynamics force value that corresponds to a force on a particular avatar body part of avatar body parts that corresponds to a particular tracked body part wherein the first array of force values are such that when applied to drive the avatar body parts, they drive the particular avatar body part towards alignment with the motion targets of the tracked body parts and the first array of force values corresponds to inverse dynamics force values of a plurality of avatar degrees of freedom, including at least one degree of freedom that is unspecified by the motion targets and thus independent of the tracked body parts;

c) program code for computing a second array of force values, wherein a force value in the second array of force values is either a balance control force value or a locomotion control force value and the second array of force values corresponds either to balance control forces needed to maintain a balance of the full body avatar in the virtual space or locomotion control forces needed to move the full body avatar as a whole (1) to maintain alignment of the tracked elements of the full body avatar with the motion targets corresponding to the position or the orientation of the one or more of the tracked body parts and (2) move the untracked avatar body part consistent with the second array of force values;

d) program code for determining movement and/or positions of one or more of the plurality of avatar body parts according to joint constraints and physics constraints defined as to those one or more of the plurality of avatar body parts using the first array of force values, and according to sensed movements of one or more of the plurality of user body parts, represented by the second array of force values; and e) program code for combining the first array of force values and the second array of force values into a summed force array.

12. The virtual reality system of claim 11, wherein the plurality of avatar body parts comprises a head, a neck, a back, a pelvis, hips, knees, ankles, feet, shoulders, elbows, wrists and hands.

13. The virtual reality system of claim 11, wherein the joint constraints are defined by a hierarchical tree graph structure of avatar body parts wherein edges of a graph correspond to joints between two avatar body parts and each joint comprises a socket joint, a hinge joint, or a universal joint.

14. The virtual reality system of claim 11, wherein sizes for avatar body parts are determined from calibration data with the calibration data corresponding to estimates of actual sizes of corresponding parts of the plurality of user body parts.

15. The virtual reality system of claim 14, further comprising:

program code for requesting a specific pose of the user;

program code for recording sensor data when the user is in the specific pose;

program code for computing the sizes for the avatar body parts based on the sensor data; and program code for storing computed sizes as avatar body part sizes for use in animating the avatar body parts.

16. The virtual reality system of claim 11, wherein the second array of force values comprises balance control force values and the second array of force values corresponds to balance control forces needed to maintain the balance of the full body avatar in the virtual space.

17. The virtual reality system of claim 11, wherein the second array of force values comprises locomotion control force values and the second array of force values corresponds to locomotion control forces needed to move the full body avatar as a whole and move the untracked avatar body part consistent with the second array of force values.

18. The virtual reality system of claim 11, further comprising:

program code for computing a third array of force values, wherein the second array of force values comprises balance control force values and the third array of force values comprises locomotion control force values; and program code for computing the summed force array as sums of the first array of force values, the second array of force values, and the third array of force values.

* * * * *